United States Patent [19]

Krüger

[11] Patent Number: 5,042,080
[45] Date of Patent: Aug. 20, 1991

[54] METHOD AND DEVICE FOR MEASURING ROTARY SPEED

[75] Inventor: Michael Krüger, Edingen-Neckarhausen, Fed. Rep. of Germany

[73] Assignee: Heidelberger Druckmaschinen Ag, Heidelberg, Fed. Rep. of Germany

[21] Appl. No.: 330,829

[22] Filed: Mar. 30, 1989

[30] Foreign Application Priority Data

Mar. 31, 1988 [DE] Fed. Rep. of Germany ....... 3811046

[51] Int. Cl.$^5$ .................................... H02P 5/00
[52] U.S. Cl. .................................... 388/809; 388/814; 388/815
[58] Field of Search .................. 388/802, 803–808, 388/809–815, 905

[56] References Cited

U.S. PATENT DOCUMENTS

| | | |
|---|---|---|
| 3,985,266 | 10/1975 | Wright, Jr. .................... 388/814 X |
| 4,381,479 | 4/1983 | Wesling et al. .................. 388/810 |
| 4,527,101 | 7/1985 | Zavis et al. .................... 388/810 X |
| 4,571,668 | 2/1986 | Azusawa et al. ................. 388/815 X |
| 4,575,246 | 3/1986 | Nishizawa et al. ................ 318/640 |
| 4,603,284 | 7/1986 | Perzley ...................... 318/568.16 |
| 4,622,500 | 11/1986 | Budelma, Jr. ................... 388/814 X |
| 4,626,754 | 12/1986 | Habermann et al. ............... 318/661 |
| 4,675,585 | 6/1987 | Krueger et al. .................... 388/802 |
| 4,731,569 | 3/1988 | Bohn ........................ 318/687 |
| 4,841,207 | 6/1989 | Cheyno ...................... 388/811 |

Primary Examiner—William M. Shoop, Jr.
Assistant Examiner—David Martin
Attorney, Agent, or Firm—Herbert L. Lerner; Laurence A. Greenberg

[57] ABSTRACT

Method of measuring the rotary speed of an electromagnetically actuated rotating device having at least one winding carrying a current, which comprises analyzing the frequency of a voltage corresponding to an alternating component of the current, and a device for performing the method.

3 Claims, 3 Drawing Sheets

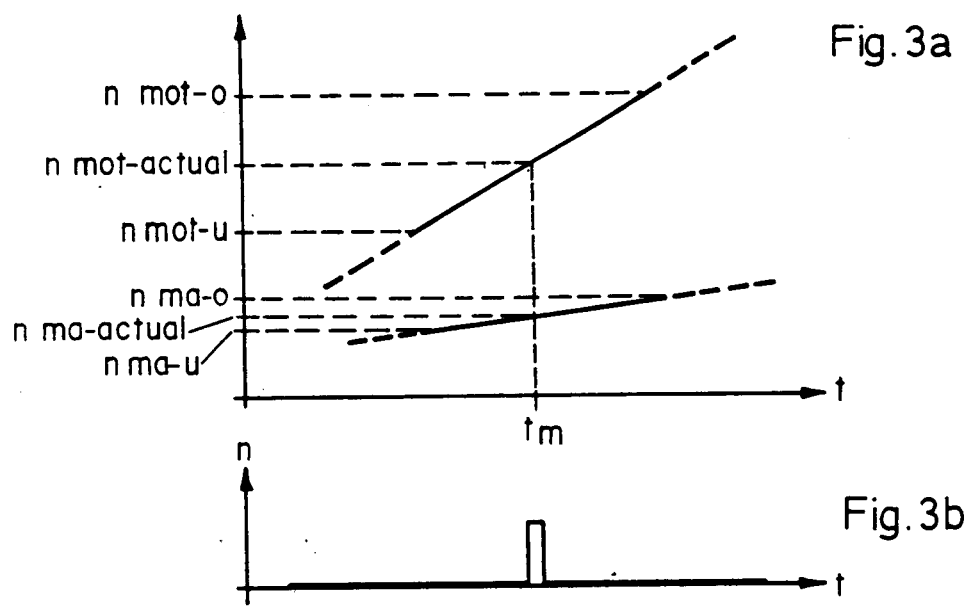
Fig. 3a
Fig. 3b
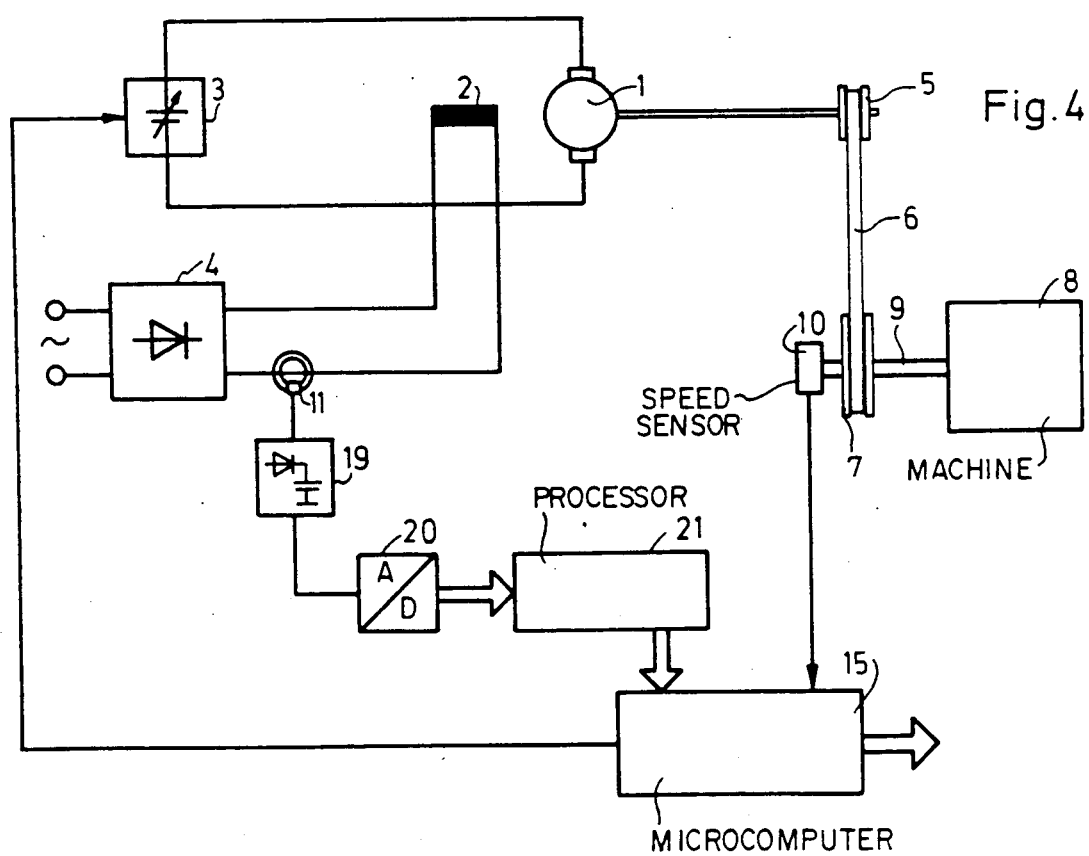
Fig. 4

METHOD AND DEVICE FOR MEASURING ROTARY SPEED

The invention relates to a method and device for measuring rotary speed and, particularly, for measuring the rotary speed of a direct-current shunt-wound motor or of the rotating part of an electro-magnetically actuated brake. It has been known heretofore to measure rotary speed with analog and digital rotary-speed sensors. However, the added cost of the sensor and, in many applications, the expense for additional conductors or leads is disadvantageous.

Further known heretofore is a method of measuring rotary speed from the commutating ripple of the armature current (Elektronik Sonderheft "Electronics Special Supplement" 1986, No. 230, Page 55). A disadvantage of this heretofore known method, however, is that the number of commutation segments must be known.

In the case of a printing machine, speed regulation is effected in a conventional manner by a rotary speed sensor mounted on the machine. In this heretofore known method, the drive motor does not have any rotary speed sensor at its disposal. The rotary speed guidance is effected by the regulation of the armature voltage. The drive of the printing machine by the motor occurs via a belt transmission having a transmission ratio selected, respectively, to adapt or match the variable maximum rotary speed of the printing machine to the fixed maximum rotary speed of the motor. For an optimal regulation of the rotary speed of the printing machine, however, not only the speed of the machine but also the speed of the motor must be determined, for which purpose another rotary speed sensor is used in the conventional machines.

It is accordingly an object of the invention to provide a method and device for measuring rotary speed of, for example, a direct-current shunt-wound motor without using a rotary speed sensor therewith. In particular, it is an object of the invention to provide a method which, when applied to a machine, preferably a printing machine, serves to ascertain the transmission ratio between the drive motor and a shaft of the machine driven by the motor via a transmission.

With the foregoing and other objects in view, there is provided in accordance with one aspect of the invention, a method of measuring the rotary speed of an electromagnetically actuated rotating device having at least one winding carrying a current, which comprises analyzing the frequency of a voltage corresponding to an alternating component of the current.

In accordance with another measure of the method of the invention, the rotating device is a direct-current shunt-wound motor and the voltage frequency which is analyzed corresponds to the alternating component of the field current of the motor.

In accordance with an alternate measure of the method of the invention, the device is a brake having a rotating part and the current carrying winding, and the voltage frequency which is analyzed corresponds to an alternating component of the current of the winding of the brake.

In accordance with a further measure, the method of the invention includes determining spectral components which are to be associated with rotary speeds lying within limits of a range of rotary speeds selected on the basis of other operating conditions.

The method of the invention make it possible to effect economies by dispensing with the use of a rotary speed sensor. A further advantage is apparent in that the method of the invention is to a great extent independent of the construction of the direct-current shunt-wound motor (number of poles, number of lamellae, and so forth) and of the brake, respectively. The method of the invention is suited for use in various different drive systems. The spectral components or lines produced in the frequency analysis which are unsuited for measuring the rotary speed, such as for example the mains frequency and the harmonics thereof, may be eliminated rather simply in many of these applications.

In accordance with an additional measure, the method also comprises applying a fast Fourier transformation (FFT) to the alternating voltage and passing off the frequency of a spectral line lying within the limits of the speed range as the speed. This results in a special advantage due to the use of a fast Fourier transformation (FFT) for which suitable signal processors are available.

The task of determining the rotary speed is frequently undertaken in order to ascertain when a motor reaches a prescribed speed. A solution to this task is offered by providing an added measure in the method of the invention which includes feeding the alternating voltage to a steep-sided band pass having an output to which a comparator is connected, varying the rotary speed of the motor within a prescribed range, and passing off the rotary speed corresponding to the limiting frequency of the band pass as the rotary speed effective at the time a variation in an output voltage of the comparator occurs.

In accordance with yet another measure, the method includes checking a transmission ratio between the motor and a shaft of a machine connected via a transmission to the motor, and comprises measuring the rotary speed of the shaft, determining the prescribed rotary-speed range from the measured rotary speed of the shaft and a prescribed range for the transmission ratio, and correlating the rotary speed of the motor and the rotary speed of the shaft.

In accordance with another aspect of the invention, there is provided a device for measuring the rotary speed of a direct-current shunt-wound motor connected to the shaft of a machine via a transmission comprising a rotary speed sensor attached to the shaft, means for controlling the rotary speed of an armature of the motor means connected to a field coil of the motor for generating a field current therein, a current/voltage transducer connected to the field current circuit and having an output linked via a frequency analyzing device to a microcomputer, and the rotary-speed sensor having an output for feeding signals to the microcomputer.

In accordance with another feature of the device of the invention, the transmission is a belt transmission. By changing the belt pulleys, the transmission ratio can be determined automatically and introduced into the system for controlling the machine.

In accordance with a further feature of the device of the invention, the frequency analyzing device is a signal processor equipped for performing a fast Fourier transformation (FFT).

In accordance with an additional feature of the device of the invention, the frequency analyzing device comprises a steep-sided band pass, a rectifier circuit and a comparator connected in series, the means for controlling the rotary speed of the motor armature being connected to and controllable by the microcomputer.

In accordance with yet another measure, the method of the invention includes selecting a spectral line suited for evaluation whenever a previously selected spectral line is found to be unsuitable for evaluation.

In accordance with a concomitant feature of the method of the invention, the selected spectral line suited for evaluation is that of an harmonic.

Other features which are considered as characteristic for the invention are set forth in the appended claims.

Although the invention is illustrated and described herein as embodied in a method and device for measuring rotary speed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 3a and 3b are time rate-of-change diagrams of signals generated with the embodiment of the device according to FIG. 2;

FIG. 4 is a view similar to that of FIG. 2 of a second embodiment of the inventive device;

In the figures, identical parts are identified by the same reference characters.

Figure 1:
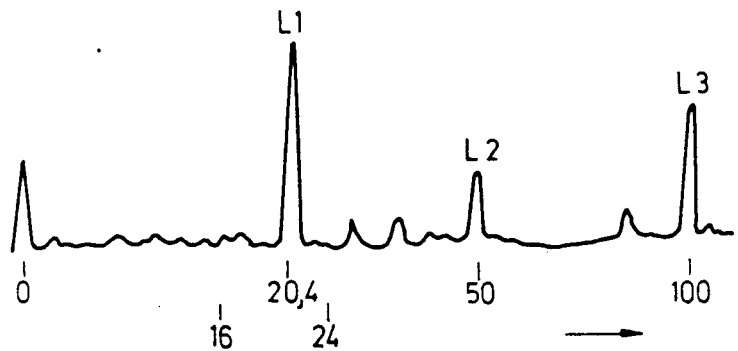
FIG. 1 is a plot diagram of the spectrum of the alternating component of a field current of a direct-current shunt-wound motor at a given rotary speed.

Referring now to the drawing and first, particularly, to FIG. 1, there is shown therein by way of example a spectrum of the field current of a direct-current shunt-wound motor rotating at a rotary speed of 20.4 revolutions per second or 1,224 revolutions per minute. Accordingly, the spectrum contains a characteristic line L1 at this frequency. Other lines L2 and L3 at frequencies of 50 Hz and 100 Hz result from the residual ripple of the direct current gained from a mains alternating current power supply. While the presence of lines at 50 Hz and at 100 Hz is independent of the respective rotary speed, the other lines, especially the line L1, are shifted with the rotary speed.

In the embodiment of the device for measuring rotary speed according to FIG. 1, a direct-current shunt-wound motor is provided having an armature 1 and a field winding 2. The armature 1 is connected to a controllable direct-current voltage source 3, while the field winding 2 obtains direct-current voltage from the alternating-current mains via a rectifier arrangement 4. A belt pulley 5 is mounted on a shaft of the direct-current shunt-wound motor, the belt pulley 5, together with a belt 6 and a further belt pulley 7 forming a transmission by the aid of which the direct-current shunt-wound motor drives a machine 8, which is represented only diagrammatically in the figure. Additionally located on a drive shaft 9 of the machine 8 is a rotary speed sensor 10.

The field current is measured with the aid of a current sensor or transducer 11 which operates, for example, in accordance with the Hall principle and delivers a voltage proportional to the field current. Only the alternating component, as such, is required for performing the method of measuring rotary speed according to the invention. This alternating component is in any case not allowed to pass through the band-pass filter 12, however. The band-pass filter 12 has relatively steep sides of the bandwidth which is passed. One of the sides of the band pass filter 12 is at the frequency which corresponds to a rotary speed of the motor at which the rotary speed of the machine is to be measured and, therewith, the transmission ratio is to be established.

A rectifier circuit 13 and a comparator 14 are connected to the output of the band-pass filter 12. The output of the comparator 14 is linked to an input of the microcomputer 15 to which also the pulses generated by the rotary speed sensor 10 are fed.

Figure 2:
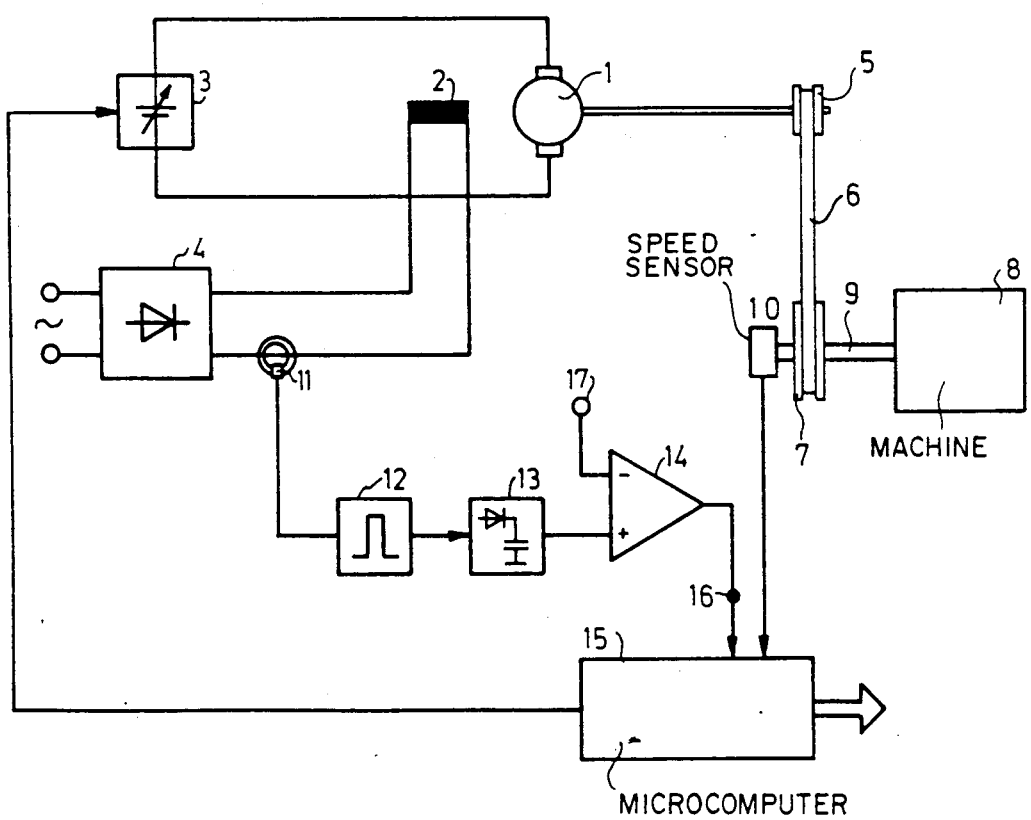
FIG. 2 is a diagrammatic and schematic view of a first embodiment of the device for measuring rotary speed according to the invention.

In the device according to FIG. 2, the transmission ratio which is determined from the sizes of the belt pulleys 5 and 7, can vary from machine to machine because it is necessary to adapt or match the variable maximum number of prints of the printing machine to the fixed maximum rotary speed of the motor. Thus, for example, in a machine which has, in fact, been built, the print count i.e. the number of prints, is 11,000 with a diameter of the belt pulley which is 142 mm whereas the print count is 12,000 when the corresponding diameter is 155 mm.

The function of the device according to FIG. 2 is explained hereinafter with regard to the diagrams shown in FIGS. 3a and 3b. The speed and the transmission ratio, respectively, can be determined during a trial run provided therefor, for example, after the machine has been started up for the first time. It is also possible, however, during normal operation if suitable rotary speeds exist during a suitable period of time.

Controlled by the microcomputer 15, the armature 1 of the direct-current shunt-wound motor is supplied with such voltage that the rotary speed passes through a prescribed range according to FIG. 3a. The rotary speed of the motor rises, in this case, from nmot-u to nmot-o, while the speed of the machine rises from nma-u to nma-o. The latter is determined with the aid of the pulses generated by the rotary speed sensor 10. The input 16 of the microcomputer 15 is active only during this rotary-speed range.

The rotary-speed range is selected in such a way that on the one hand, it is possible to determine all of the transmission ratios which occur and, on the other hand, the determination of the spectral line is clear and unequivocal. If, for example, the reference voltage fed to the comparator at 17 is so high that, in the spectrum according to FIG. 1, the lines L1, L2 and L3 are registered or detected, the rotary-speed range of the motor can lie, for example, between nmot-u=16 revolutions per second and nmot-u=24 revolutions per second. While this rotary-speed range of the motor is being passed through, only the line L1 is in the corresponding spectral range.

The band-pass filter 12 is then adjusted or attuned in such a way that its lower side lies at that frequency at which the transmission ratio is to be determined and checked, respectively. This rotary speed nmot-actual is reached at time tm, which is represented in FIG. 3b with a signal jump.

At this instant, the value nma-actual of the machine's rotary speed is read into the microcomputer. By means of a division of the rotary speed of the motor, which at this time corresponds to the lower limiting frequency of the band-pass filter 12 and of the read-in speed value, a determination of the transmission ratio tr is possible. This value can be delivered via a data bus, for example to a superior control system for the machine. As the rotary speed increases further, the upper limiting frequency of the band-pass filter 12 is exceeded, if necessary or desirable, so that the output voltage of the rectifier circuit, as represented in FIG. 3b, falls again.

In the embodiment of the device according to FIG. 4, the spectral analysis occurs with the aid of a signal processor 21 to which the alternating component of the field current is fed via a high pass filter 19 and an analog/digital transformer 20. In a conventional manner, the signal processor 21 is programmed to implement a fast Fourier transformation (FFT). Detailed information for programming a signal processor of the type TMS 320 of the company Texas Instruments for the FFT can be found in R. Kung, "Flexible FFT processor solves real-time tasks", Elektronik ("Electronics") 21, Oct. 17, 1986, Pages 101 to 110. The result is fed to the microcomputer 15. In this regard, it is not necessary to pass the signal through a prescribed rotary speed range as in the embodiment of the device according to FIG. 2. The rotary speed ratio is determined only through the spectral line L1 and the output pulses of the speed sensor 10 if the rotary speed is within the prescribed range.

Figure 5:
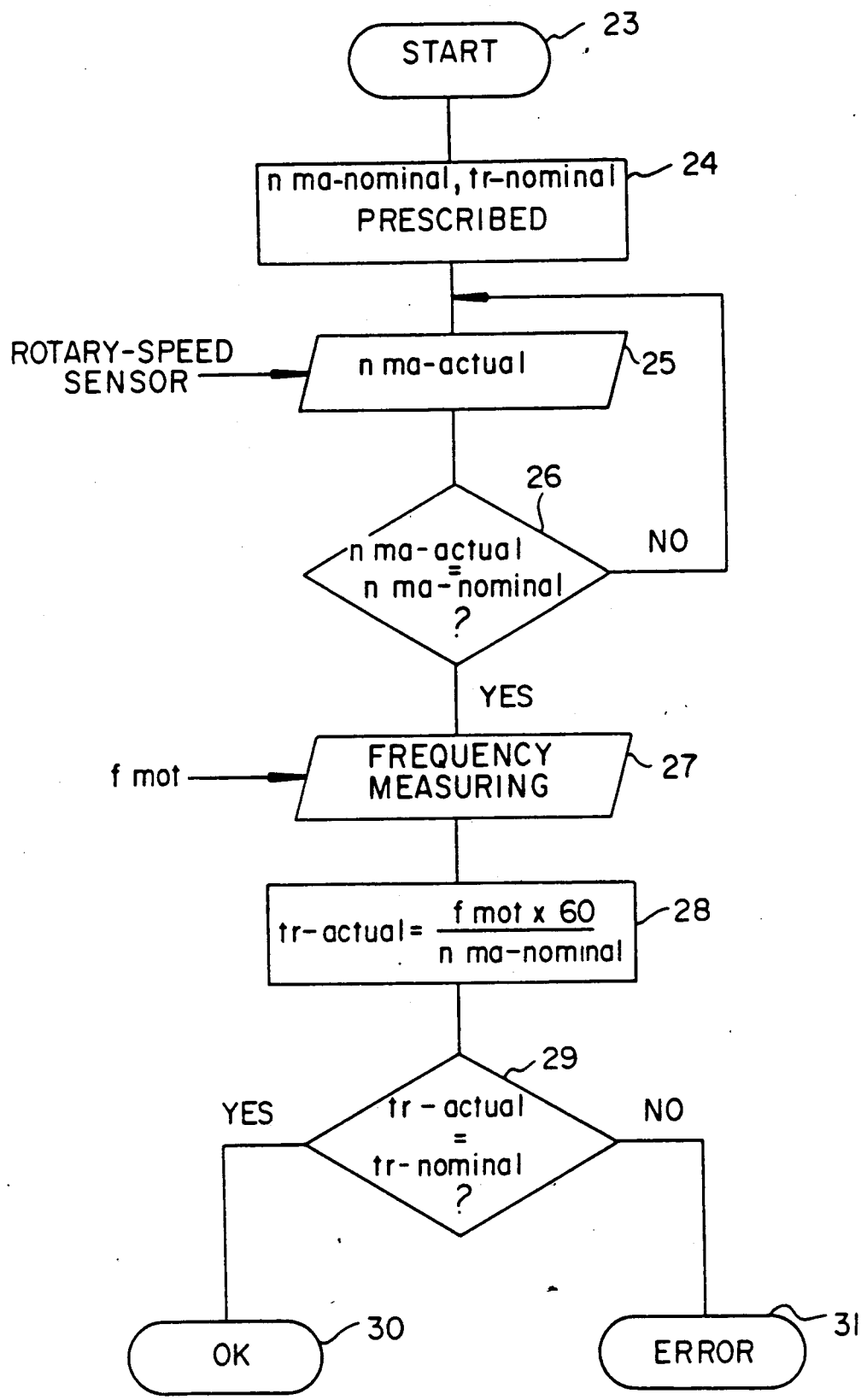
FIG. 5 is a flow chart of a program for a microcomputer employed in the device according to the invention.

FIG. 5 shows a flow chart or diagram of a program with which a check is performed as to whether the transmission ratio tr-actual corresponds to the given transmission ratio tr-nominal. For this purpose after starting up the appropriate program at 23, a nominal rotary-speed value nma-nominal for the machine and a transmission ratio tr-nominal are prescribed (program part 24). Thereafter, at 25 the actual rotary speed of the machine nma-actual is read in and compared at 26 with the nominal rotary speed of the machine nma-nominal. As long as the rotary speeds do not agree, a loop consisting of the program steps 25 and 26 is repeated. Only if the rotary speeds agree does measuring of the frequency occur at 27 for which the corresponding frequency of the spectral line L1 (FIG. 1) is received in the microcomputer from the signal-processor 21 (FIG. 4).

In the program part 28, the transmission ratio tr-actual is then calculated from the respectively determined and prescribed values. This transmission ratio tr-actual is compared at 29 with the nominal value for the transmission ratio tr-nominal. When the transmission ratio values are in agreement, the correctness of the transmission ratio is reported at 30, and when they do not agree, an error report is issued at 31.

In some cases of application, especially in printing machines with only one or two printing units, the moment curve of the load over the angle of rotation is very irregular or nonuniform. If, moreover, a particularly soft rotary speed regulator or control is installed, more pronounced fluctuations in the rotary speed of the drive occur. The determination of the rotational speed of the motor is thereby rendered more difficult. In accordance with the dynamics of the various different rotary speeds, it is necessary to obtain an evaluation with sufficient rapidity.

If the working speed of the evaluation circuit i.e. of the microcomputer 15, in the illustrated embodiments is too low to follow the fluctuations of the rotary speed, multiple measurements should be taken and a subsequent mean value determination should be made.

The invention is not limited to the illustrated embodiments but can be realized in practice by a person of ordinary skill in the art also in other ways. Thus, for example, by using a suitable program in the microcomputer, another spectral line can be sought and evaluated if the spectral line which was originally intended for evaluation is too weak or subject to disturbance. Further embodiments are possible by means of other signal filtering methods and circuits.

I claim:

1. Method of measuring the rotary speed of an electromagnetically actuated rotating device having at least one winding which comprises passing a current through the winding for rotating the device; measuring an alternating component of the current; performing a spectral analysis of the frequency of a voltage corresponding to the alternating component of the current, the rotating device being a direct-current shunt-wound motor, and the voltage frequency which is analyzed corresponding to the alternating component of the field current of the motor; feeding the alternating voltage to a steep-sided band pass filter having an output to which a comparator is connected; varying the rotary speed of the motor within a prescribed range; using the rotary speed corresponding to a side frequency of the band pass filter as an effective rotary speed at the time of a variation in an output voltage of the comparator occurs.

2. Method according to claim 1, further including a step for determining a transmission ratio between the motor and a shaft of a machine connected via a transmission to the motor; which comprises measuring the rotary speed of the shaft, determining a prescribed rotary-speed range from the measured rotary speed of the shaft and a predetermined range for the transmission ratio, and dividing the rotary speed of the motor with the rotary speed of the shaft.

3. Device for measuring the rotary speed of a direct-current shunt-wound motor connected to the shaft of a machine via a transmission, comprising a rotary speed sensor attached to the shaft, means for controlling the rotary speed of an armature of the motor, means connected to a field coil of the motor for generating a field current therein, a current/voltage transducer connected to the field current and having an output linked via a frequency analyzing device to a microcomputer, and the rotary-speed sensor having an output for feeding signals to said microcomputer, said frequency analyzing device comprising a steep-sided band pass filter, a rectifier circuit and a comparator connected in series, said means for controlling the rotary speed of the motor armature being connected to and controllable by said microcomputer.

* * * * *